United States Patent [19]

Stein

[11] 4,194,201
[45] Mar. 18, 1980

[54] INTERROGATOR-RESPONSOR SYSTEM

[75] Inventor: Hans-Jürgen Stein, Eichenau, Fed. Rep. of Germany

[73] Assignee: Siemens Aktiengesellschaft, Berlin & Munich, Fed. Rep. of Germany

[21] Appl. No.: 385,593

[22] Filed: Jul. 23, 1973

Related U.S. Application Data

[63] Continuation-in-part of Ser. No. 76,272, Sep. 23, 1970, abandoned.

[51] Int. Cl.² .............................................. G01S 9/56
[52] U.S. Cl. ............................................... 343/6.5 LC
[58] Field of Search ...................... 343/6.5 R, 6.5 LC

[56] References Cited

U.S. PATENT DOCUMENTS

| 3,860,922 | 1/1975 | Wagner | 343/6.5 R X |
| 3,900,867 | 8/1975 | Wagner | 343/6.5 LC |
| 3,949,397 | 4/1976 | Wagner et al. | 343/6.5 R |

Primary Examiner—T. H. Tubbesing
Attorney, Agent, or Firm—Hill, Van Santen, Steadman, Chiara & Simpson

[57] ABSTRACT

An interrogator-responsor system which permits the transmission of a number of different interrogation codes. Means are provided for changing the interrogator and responsor codes according to a time program and means are also provided to synchronize the program in each of the interrogator and responsor units. The interrogator has means for comparing the interrogator code with the code of the answering signal from the responsor to permit evaluation of the answering signal when the interrogator code and the answering code are in agreement.

5 Claims, 8 Drawing Figures

FIG. 2b ($\Delta t=0$)

FIG. 2c ($\Delta t=+2\,sec$)

FIG. 2d ($\Delta t=-2\,sec$)

INTERROGATOR-RESPONSOR SYSTEM

CROSS REFERENCE TO RELATED APPLICATION

This application is a continuation-in-part of Ser. No. 76,272, filed Sept. 23, 1970, now abandoned.

BACKGROUND OF THE INVENTION

Field of the Invention

The field of art to which this invention pertains is systems for transmitting coded information from an interrogator unit to a responsor unit and for receiving coded information from the responsor unit in such a way as to prevent an enemy from imitating or otherwise interfering with the exchange of information between the interrogator and responsor.

SUMMARY OF THE INVENTION

It is a principal feature of the present invention to provide an improved interrogator-responsor system which permits the exchange of coded information which may not be readily imitated by the enemy.

It is a principal object of the present invention to provide an interrogator responsor system which permits the interrogator to transmit a plurality of codes which may be continuously changing according to a time program which time program is incorporated into the responsor unit and maintained in synchronism with program in the interrogator.

It is also an object of the invention to provide an interrogator-responsor system as described above wherein means are provided in the interrogator for comparing the interrogator code with the responsor code to determine whether the answering signals from the responsor have originated from a friendly source.

It is another object of the present invention to provide an interrogator-responsor system as described above wherein the code is altered according to the program at least once during each revolution of a radar device which is transmitting the code information.

BRIEF DESCRIPTION OF THE DRAWINGS

Other objects, features and advantages of the invention will be best understood from the following detailed description taken in conjunction with the accompanying drawings, on which:

FIGS. 2a to 2d show a pulse schedule to illustrate the arrangement of the coded information which may be transmitted by the interrogator of the present invention;

DESCRIPTION OF THE PREFERRED EMBODIMENT

The invention relates to an interrogator-responsor system which permits the transmission of different codes to a responsor which upon agreement of its internal code with the incoming code transmits a response signal as well as a time signal.

It is known from the German Published Specification No. 1,263,872, to provide time signals in the responsors of a secondary radar system to prevent several responses coming from approximately the same direction and emanating from different responsors, which would mutually influence one another and render evaluation of the response difficult or impossible.

During the transmission of interrogator signals, it is possible that such signals may also be received by the enemy and through comparison with response signals emitted from responsors, the type and composition of the interrogator code may be ascertained. In this manner, enemy may transmit interrogator signals and thereby release response signals. It is possible to disturb the entire system appreciably so that for example an opponent aircraft may be detected as friend.

The problem of the present invention is to indicate a way in which it is possible to prevent the imitation and also the disturbance of interrogations. In accordance with the invention different interrogator codes are available at the same time, of which m are transmitted consecutively according to a changeable pattern. The responsor responds at a determined point of time solely to m-p of the transmitted interrogator codes, where $p \geq 1$ and is an integer. The codes are altered in the interrogator and responsor synchronously according to the same program. Response signals entering the interrogator are investigated by being compared with the interrogator code utilized, and only comparable response signals are permitted for evaluation.

Figure 1:
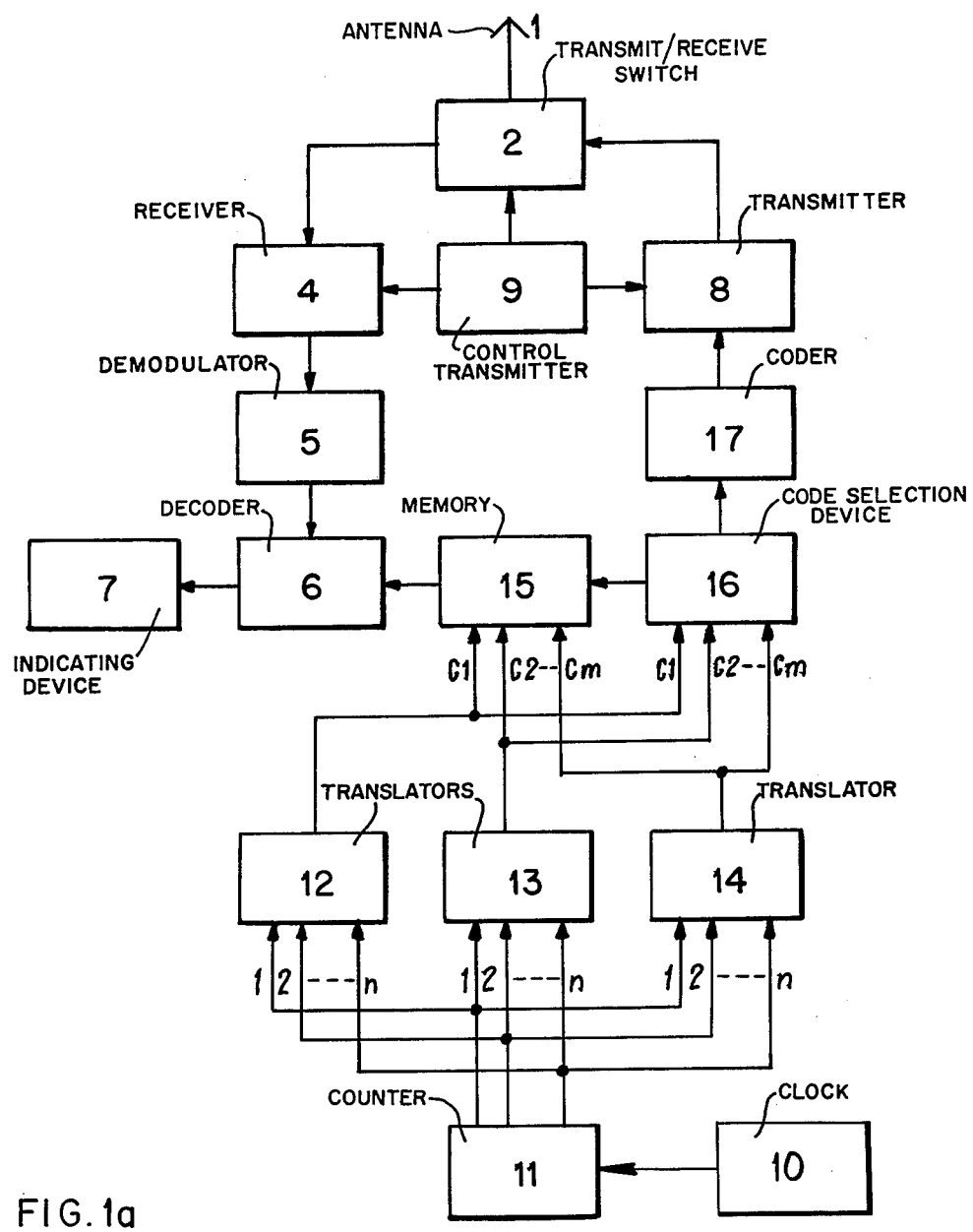
FIG. 1 shows a block circuit diagram of the interrogator of the present invention utilizing well known components in each of the individual blocks to comprise the total circuit of the interrogator.

The interrogator according to FIG. 1 includes a directional antenna 1 connected to a transmitter/receiver switch (T/R switch) 2 from which one output leads to the receiver 4 which is connected in series with a demodulator 5. The received response signals are coupled to a decoder 6 and are subsequently fed to an indicating device 7.

A control transmitter 9 is coupled to the transmitter 8, to the receiver 4, and to the T/R switch 2 and controls activation of and connection to the antenna of the transmitter 8 and the receiver 4. The preparation of the code in the interrogator takes place through a clock 10, a counter 11 and translators 12, 13, and 14. The interrogator codes which are available at the output of these translators 12 to 14, are, on the one hand, fed to a memory 15 and, on the other hand, to a code selection device 16 which is connected with the coder 17. The memory 15 is supplied by the translators 12 to 14 or by the code selection device 16, respectively, with information regarding possible and actual codes sent out in each case and controls the decoder 6.

The clock 10 may, for example, consist of a synchronizing generator and a frequency divider. The clock 10 controls the counter 11 in such a manner that it performs a counting operation after a predetermined time. It is preferred that the code be changed at least at each revolution of the customary surveillance radar equipment. Since customarily the revolution time T lasts up to 10 seconds, the counter 11 should be advanced at least approximately by one counting step every 10 seconds. The frequency of the change of the interrogator code is a compromise between the technical expenditure with respect to the stability of frequency for the clock 10 and the need for protection against imitators or jammers.

If it is assumed that the counter 11 is an n-step binary counter or a feedback shift register with n points then the outputs in systematic series sequence have all possible combinations from n bits, so that there results $2^n$ possible Yes/No data at the outputs.

As the counter alone, by virtue of its internal structure, supplies the different combination possibilities according to a predetermined operating plan, an enemy observer could within a period of observation determine this operating plan and then cut in through jamming or imitation of the interrogator system. Therefore, there are arranged means between the clock 10 and the code-selection device 16 which provide for a pulse distribution which is reproducible in the response and which masks the plan of operation.

Figure 1A:
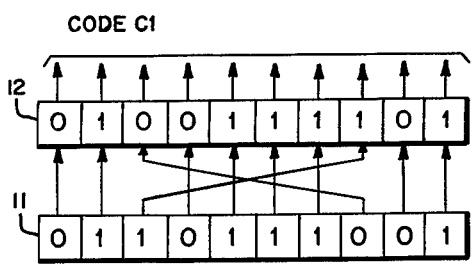
FIG. 1a is a schematic representation of an exemplary translator which may be used in practicing the invention.

This may, for instance, be attained by connecting translators in series with the outputs in the form of plugs or a printed switchboard which connect its n inputs with n outputs in a desired determinable freely selectable sequence. With such structure n different translations may be realized. As shown in FIG. 1a for example, the result may be the following distribution at the output of the counter 11 (n=10):

0110111001

If the third input of the translator 12 is connected to its eighth output, and the eighth output is connected with the third output the following distribution results:

0100111101

This distribution at the output of the translator 12 is supplied as the code C1 to the code selection device 16 and the memory 15. As all translators have a different distribution, there are produced with n translators, a total of m codes. The described selection of codes by means of translators is for example only. Other methods may be used.

Figure 2A:
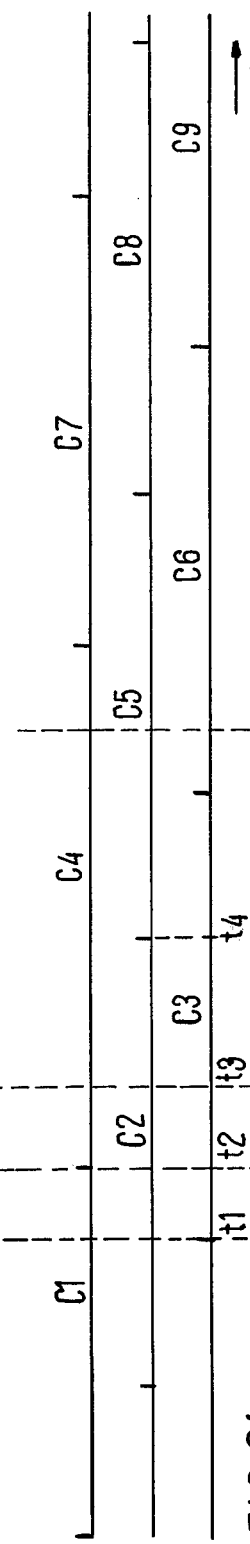
Figure 2A:
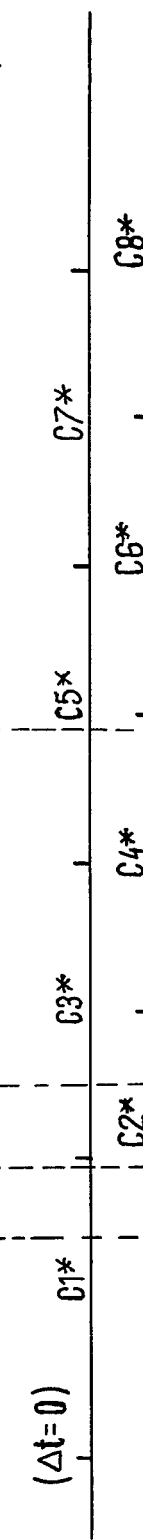
Figure 2A:
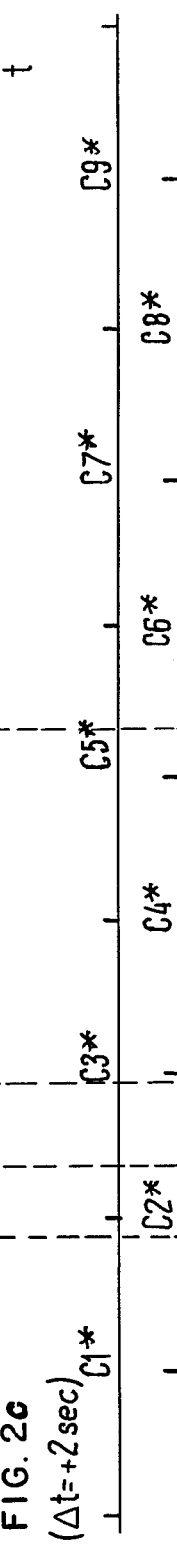
Figure 2A:
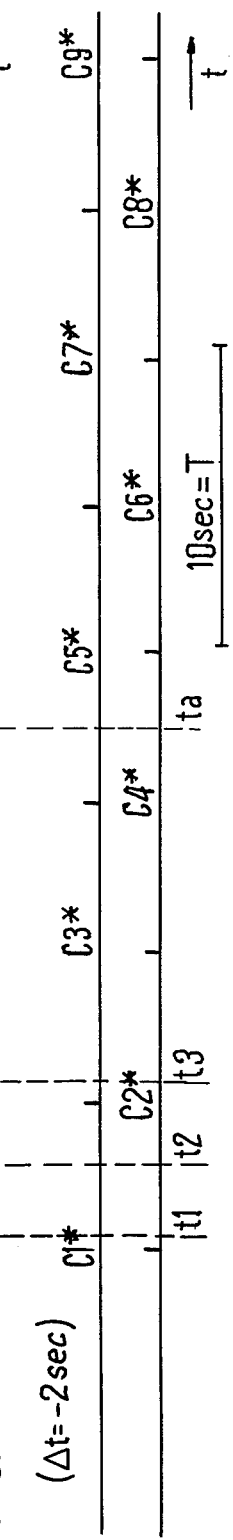

A distribution of codes is shown in FIG. 2a in the time domain. For this distribution it is assumed that m=3, that is, in total, three codes are available to the code selection device 16, and also only three translators are provided. The codes C1, C2 and C3 are offset timewise with respect to one another. This shifting, with an all-surveillance radar device, is suitably undertaken so that each radar revolution time T encounters at least one change of code. The time during which a determined code is present for the selection is correspondingly greater than the radar revolution time T and amounts in the present example to 1.5 T. The codes C1, C2 and C3 are simultaneously present in the time between t1 and t3 (this time corresponds to half the radar revolution time T) in the selection device 16. After the time period t3, the code C4 follows the code C1 and after the point of time t4, the code C5 follows the code C2 etc. During the time t1 and t3, q interrogations are to be transmitted. The selection from the codes which are available by the code selection device 16 is as desired and does not need to be reproducible in the responsor. Thus, for example, with m=3 and q=12, the following code distribution may be produced in the selecting device 16:

C2,C1,C2,C2,C1,C3,C2,C2,C3,C1,C2,C3

These interrogation codes reach the transmitter 8 by way of the coder 17 and over the T/R switch 2 they reach the antenna 1, from which they are radiated.

The codes C1 to Cm emanating from the translators 12 to 14 and present at a determined point of time reach the memory 15 where they are stored for a suitable time and later compared with the code distribution of the incoming responsor signals. In addition, information encountered by the code selection device 16 and the memory 15, is likewise stored and is also brought up for evaluation with the incoming responsor signals.

Figure 3:
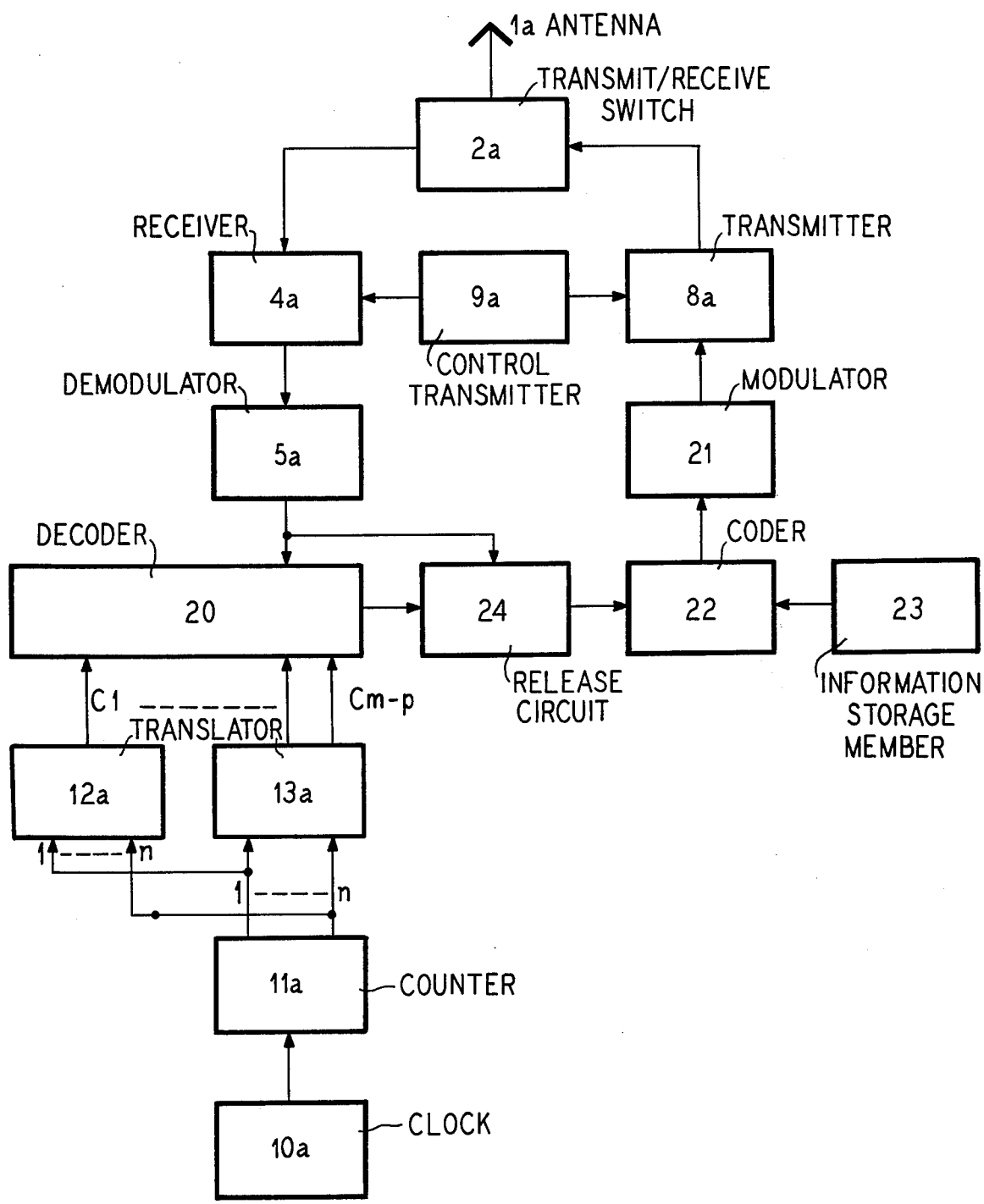
FIG. 3 shows a block circuit diagram of a responsor unit according to the present invention which is comprised of a series of blocks which in themselves are well known in the art which together comprise the combination known as the responsor.

At the responsor, according to FIG. 3, there is also provided an antenna 1a, a T/R switch 2a, a receiver 4a, a demodulator 5a, a control transmitter 9a as well as a transmitter 8a. Besides, there is connected in series with the transmitter 8a a modulator 21 as well as a coder 22, which on its part cooperates with an information storage member 23 containing for example the height, and flight velocity of an aircraft. Furthermore, a release circuit 24 is provided.

At the responsor there is also provided a clock 10a, a counter 11a, as well as m-p translators 12a and 13a. The construction and the functional path of the clock 10a, the counter 11a, the translators 12a and 13a as well as of the elements 1a, 2a, 4a, 5a, 8a and 9a coincide with the correspondingly designated parts of FIG. 1. A difference consists solely in that in place of m translators, only m-p translators are provided, where $p \geq 1$ and is an interger.

The clock 10a in the responsor, and the clock 10 in the interrogator run synchronously. In addition, the internal construction of the translators 12a and 13a is the same as that of the translators 12 and 13. This results in each case in the same codes being present. Codes C1*, C2*, C3*, C4*, etc., shown in the time chart (FIGS. 2a, 2b, 2c and 2d) are supplied to the decoder 20. These codes C* exist for a shorter time than the codes C in the interrogator, namely, for a time of T=10 sec. In this connection, the codes C*, when no time deviation occurs between the clock 10 of the interrogator and the clock 10a of the responsor are symmetrical to one another, that is, the time center of codes C and C* correspond to one another.

Of the interrogation codes coming in during the time t1 to t2 with the following distribution:

C2,C1,C2,C2,C1,C3,C2,C1,C3,C1,C2,C3,     (1)

interrogations with the code C3 according to FIG. 2b cannot be answered, because the code C3* in the responsor is only available after the time t2, and therefore only responses to interrogations with the codes C1 and C2 may be given the following answering signals would come from a responsor according to FIG. 2:

C2,C1,C2,C2,C1,—,C2,C1,—,C1,C2—     (2)

An answering device or responsor whose clock 10a runs ahead with respect to the clock 10 in the interrogator according to FIG. 1, for example, by 2 seconds, with a radar revolution time T of 10 seconds, provides a code distribution according to FIG. 2c. The responses resulting in the time t1 to t2 for an interrogation according to (1) read as follows:

C2,C1,C2,C2,—,C3,C2,—,C3,—,C3,C3    (3)

The memory 15 may determine that indeed the incoming answer does not have the exact synchronism, but that solely a time shift is present, and the answering signals come from a responsor belonging to a friendly system.

For a clock of a responsor lagging by 2 seconds with respect to the clock 10 according to FIG. 1, the code distribution according to (1), there results the following response in the time t1 to t2:

C2,C1,C2,C2,C1,—,C2,C1,—,C1,C2,    (4)

This distribution corresponds to the distribution of the interrogation signals obtained with the time schedule according to FIG. 2b. The information transmitted by the decoder 20 in case of coincidence to the release circuit 24, in such manner that for an incoming code C a corresponding code C* is present in one of the translators 12a or or 13a, has the result that in the coder 22 the information present in the information storage member 23 is appended to the answering signal by way of the modulator 21 modulated to the transmitter 8a and by way of the T/R switch 2a and the antenna 1a radiated back to the interrogator, where the evaluation of the answer is undertaken in the decoder 6 on the basis of the information data stored in the memory 15 regarding the code-distributions previously transmitted. It is, however, also possible to transfer solely the friend-foe knowledge and to append no further air-borne information data. This has the result that, upon a definite interrogation code, the response is solely made with the corresponding interrogation code in each case. In addition to the previously treated codes, further coded information may be present in the interrogator. For example, the interrogator may contain data valid for a day or for predetermined dates. Such data is then transmitted together with the previously described response codes.

The release circuit 24 is fed the interrogation code C1 to Cm via the line connected to the demodulator 5a. However, only the codes C1 to Cm-p are directed to the coder 20. This provides that, for example, the interrogation codes C3 are not answered during the repitition time T in which the distribution (1) is used. The determination as to whether an interrogation code C1 to Cm is answered is made in the release circuit 24. The coder 22 which is needed for the formation of the answering signal is only controlled if a code C1 to Cm occurs at the line entering from above and simultaneously a corresponding code is available at C1 to Cm-p. The release circuit 24 therefore has the character of an AND gate which is a distribution according to FIG. 2 always allows an answer as a code C2, C1 . . . occurs; however, not if a "—," occurs.

For additional information concerning radar IFF systems, the reader is referred to U.S. Pat. No. 3,368,219 and to R. S. H. Boulding "Principles and Practice of Radar", George Newnes Limited, Southampton Street, London W.C.2, for example, Page 473.

The code distribution (3) is derived from FIG. 2c, it being assumed that the clock of the answer device is two seconds early. In the range of t1 to t2 the following codes are true in the answering device: the code C1 (however only for a short time at the beginning), the code C3 (after the end of the code C1 as is indicated by a short vertical line) and the code C2. Correspondingly, in the beginning interrogation code C1 is still answered (c2, c1, c2, c2 . . . ); later on, however, this no longer occurs (c2, c1, c2, c2, c3, c2, —, . . . ). The corresponding points at which C1 is answered or not answered, respectively, are marked by underlining. In the distribution (4) the same distribution results as in a synchronous clock [equal distribution (2)]. A clock which is late is, for this example, without importance, at least with respect to small second values. However, it should be observed that in another assumption of the time, for example, in a time between t2 and t3 according to FIG. 2d, a completely different result may occur that means that in such case similar conditions may occur as in FIG. 2c.

For a more detailed discussion of translators which may be employed in practicing the present invention, the reader is directed to several publications including "Handbook of Information Processing" by Steinbuch, Springer-Verlag, Berlin/Heidelberg/New York, 1967, Pages 969–971, the 1957 issue of the periodical "NTZ", Pages 277 et seq, the article by Karnaugh entitled "The Map Method for Synthesis of Combinational Logic Circuits", appearing in the November 1953 issue of the AIEE Transactions Part I, Pages 593–598, the latter of which discloses a simplified example of a translator.

Inasmuch as the Steinbuch publication and the "NTZ" publication are not in English, excerpts of these publications are set forth below.

The first half of Page 970 of Steinbuch states that coupling control can be described as follows.

$$x_1 \equiv x_2 \Rightarrow y$$

$$(\bar{x}_1 \& \bar{x}_2) \vee (x_1 \& x_2) = y.$$

The article continues with a discussion as to how the output variable is a mere function of the input variable. If several circuits are combined into a network in such a way that several output variables $y_1, y_2, y_3, \ldots$ etc are provided, one can refer to a translator. Further, the author recognizes that the English language term "combinational switching circuit" is now in somewhat general use. Each combination of input information $x_1, x_2, x_3, \ldots$ etc which is available at a certain time leads to one combination of output variables $y_1, y_2, y_3 \ldots$ etc. A circuit of this type is, in this sense, a small scale translator. The translator does not employ storage elements. When the $y_i$ output depends at a certain time on a $x_k$ input, it is obviously not important which combination of input information $x_k$ has previously been applied to the input before this particular time, or at any other time. By means of a system of coupling equations of Boolean Algerba, the character of a translator can be described. The extension of the actual coupling process over long periods of time has therefore been eliminated from consideration. In a particularly simple example the description of the translator may be set forth in the form of a table as follows:

| $X_1$ | $X_2$ | $X_3$ | $Y_1$ | $Y_2$ | $Y_3$ |
|---|---|---|---|---|---|
| 0 | 0 | 0 | 1 | 0 | 0 |
| 0 | 0 | 1 | 1 | 0 | 1 |
| 0 | 1 | 0 | 1 | 0 | 0 |
| 0 | 1 | 1 | 0 | 1 | 1 |
| 1 | 0 | 0 | 1 | 0 | 1 |
| 1 | 0 | 1 | 0 | 1 | 0 |
| 1 | 1 | 0 | 0 | 0 | 1 |
| 1 | 1 | 1 | 0 | 0 | 0 |

The "NTZ" article discusses translators on Page 279, as follows. All electrical translators in previously mentioned cases have a common feature in that words of an input language are to be translated into words of an output language. For example:

| INPUT LANGUAGE | OUTPUT LANGUAGE |
| --- | --- |
| Number Code A | Number Code B |
| Multiplicand and Multiplier | Product |
| Sum A, Sum B | Sum A + B |
| Telephone Character | Conductor Path |
| Telephone Character | Zone |
| Gross Salary, Tax Bracket | Amount of Tax |
| No. Article | Price of Article |
| Name of Post Office (Telephone Office) | Area Code |
| Words of Language A | Words of Language B |

In general, each word of the input language must be illustrated in the translator in some form, individually and explicitly, unless it is a coincidence circuit in a static translator, or it is arranged as a storage cell in a memory. For example, during multiplication, the result cannot be obtained merely from the multiplier or from the multiplicand which means that all possible combinations from both quantities must be formed in a decimal multiplier number from a corresponding number of coincidence circuits (as shown in FIG. 2 of this article). Only if the multiplier or the multiplicand is zero, will one quantity statement be sufficient, which means that the coincidence circuits for $0 \times 0, 0 \times 1, 0 \times 2 \ldots 0 \times 9$ can be omitted, and from a zero in the input, the result zero can be directly obtained. As in these simple example, in the case of most applications under normal circumstances, all complete input words must be set forth separately so that a translator with 10,000 input words, for example, wherein no corelation exists between input words and output words, requires a total of 10,000 individual coincidence circuits (as illustrated in Section 3.6 of this article) and this effort and expense cannot be reduced by any technical measure.

Figure 4:
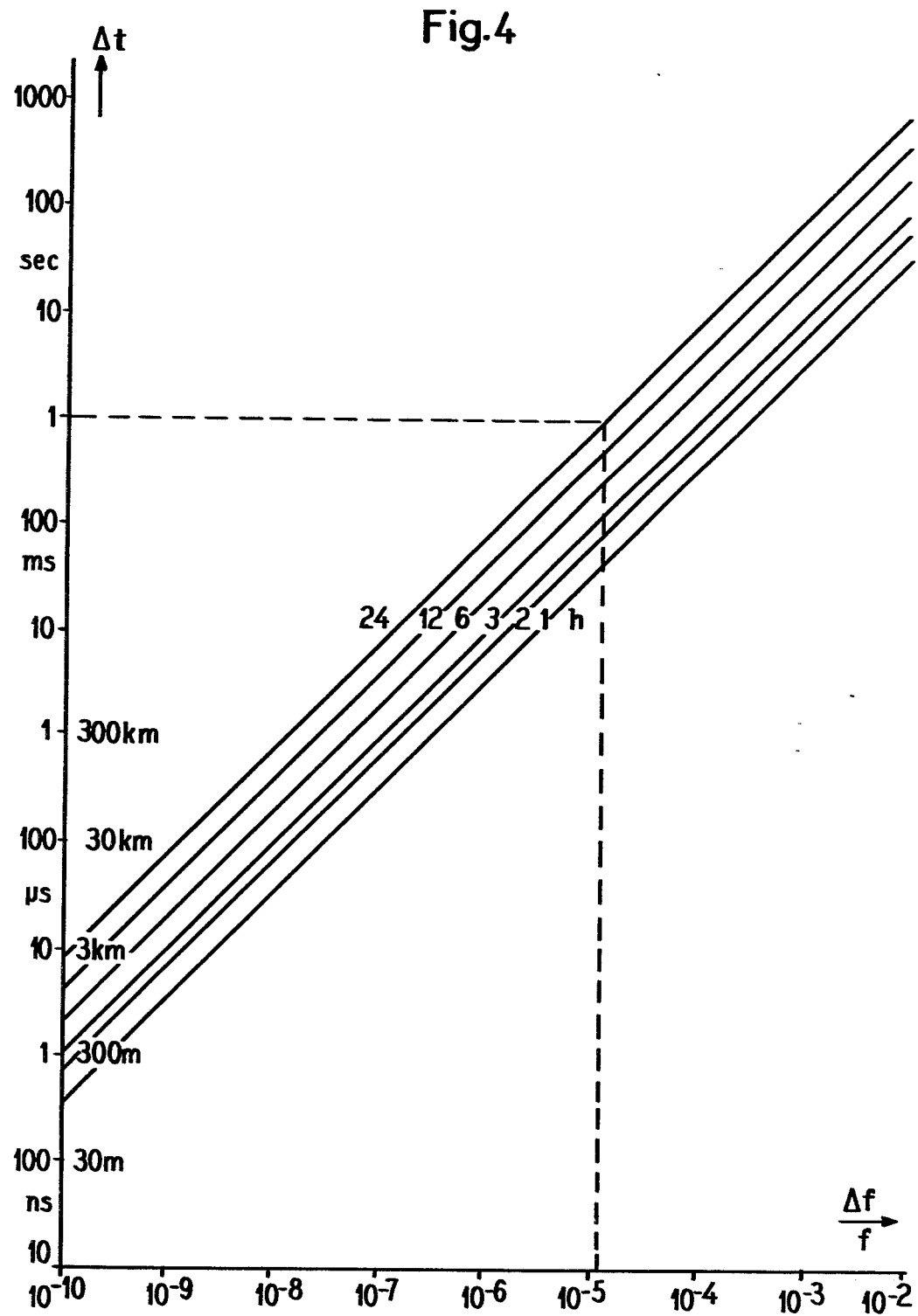
FIG. 4 shows a frequency-time diagram which illustrates the amount of error that is permitted in the synchronizing clocks of the interrogator and responsor as shown in FIGS. 1 and 3.

The accuracy requirements of the clock $10a$ in the responsor is illustrated in FIG. 4. FIG. 4 shows for durations of 1 to 24 hours the time deviation $\Delta t$ (sec) in relation to the relative frequency deviation $\Delta f/f$ applied to the abscissa. For a duration of 24 hours, there results a maximum permissible time deviation $\Delta t$ of 1 sec. and a relative frequency deviation of approximately $10^{-5}$ results. This requirement may be realized without great difficulties by means of a tuning fork or quartz generator clock. If the accuracy requirements are increased, then quartz generators with thermostats may be required.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. The combination of an interrogator which permits the transmission of different interrogation codes and at least one answering device which upon agreement with a previously received code transmits an answering signal, said interrogator having means for generating a plurality of different interrogation codes simultaneously, means for transmitting a number m of said codes in sequence, means for continuously changing the interrogator and answering codes according to a time distribution program, a memory in said interrogator for storing the code sequence transmitted to said answering device, said answering device reacting only to m-p of the transmitted interrogation codes, where $p \geq 1$ and is an integer, means in said interrogator for receiving and decoding answering signals, said decoding means in the interrogator being connected to said memory for comparing the interrogator codes stored in said memory with the sequence of codes of the answering signal.

2. The combination set forth in claim 1 wherein a revolving radar device is employed for transmitting said codes and wherein the code changes at least once during the revolution time of said radar device.

3. The combination set forth in claim 1 comprising clock means in said interrogator and in said answering device for synchronized operation and counting means operated by said clock means, translating means in parallel to provide output codes at their outputs which are different from one another.

4. The combination set forth in claim 3 wherein said counter and translator means includes a counter connected to and operated by said clock means and a plurality of translators each connected to said counter and freely selectable with respect to their respective inputs.

5. The combination set forth in claim 1, wherein said answering device includes means for generating said answering codes for durations shorter than the durations of the interrogation codes, and corelation of the codes is such that valid codes are those which have coinciding centers of their respective time ranges.

* * * * *